United States Patent
Lukens et al.

(10) Patent No.: US 11,735,187 B2
(45) Date of Patent: Aug. 22, 2023

(54) HYBRID ROUTING FOR HANDS-FREE VOICE ASSISTANT, AND RELATED SYSTEMS AND METHODS

(71) Applicant: Apple Inc., Cupertino, CA (US)

(72) Inventors: Myra C. Lukens, Vancouver, WA (US); Shehryar Lasi, San Francisco, CA (US); Kisun You, Campbell, CA (US)

(73) Assignee: Apple Inc., Cupertino, CA (US)

( * ) Notice: Subject to any disclaimer, the term of this patent is extended or adjusted under 35 U.S.C. 154(b) by 341 days.

(21) Appl. No.: 16/868,351

(22) Filed: May 6, 2020

(65) Prior Publication Data
US 2020/0380992 A1    Dec. 3, 2020

Related U.S. Application Data

(60) Provisional application No. 62/854,157, filed on May 29, 2019.

(51) Int. Cl.
| | |
|---|---|
| *G10L 15/30* | (2013.01) |
| *G10L 15/26* | (2006.01) |
| *H04M 1/72412* | (2021.01) |

(52) U.S. Cl.
CPC ............ *G10L 15/30* (2013.01); *G10L 15/26* (2013.01); *H04M 1/72412* (2021.01)

(58) Field of Classification Search
CPC . G10L 15/22; G10L 5/26; G10L 15/30; G10L 25/60; G10L 25/06; H04M 1/72412; H04M 1/605; G06F 3/167; G07F 17/3241
USPC .................................................... 704/270, 270.1
See application file for complete search history.

(56) References Cited

U.S. PATENT DOCUMENTS

| | | | |
|---|---|---|---|
| 7,413,513 B2* | 8/2008 | Nguyen | G07F 17/3241 463/39 |
| 2020/0057606 A1* | 2/2020 | Jeong | G06F 3/167 |

OTHER PUBLICATIONS

Bluetooth, https://www.bluetooth.com, last accessed May 29, 2019, 2 pages.
Developing Bluetooth Audio Devices. Blue Giga, www.bluegiga.com, Apr. 30, 2014, 42 pages.

* cited by examiner

*Primary Examiner* — Md S Elahee
(74) *Attorney, Agent, or Firm* — BakerHostetler

(57) ABSTRACT

An appliance can include a microphone transducer configured to receive sound from an environment and to convert the received sound into an audio signal. The appliance can be configured to receive an input audio signal via the microphone transducer, responsive to an activation input. The appliance can be configured to initiate a bi-directional, wireless communication connection with an external device in parallel with receiving the input audio signal, and responsive to the activation input. The appliance can be configured to transmit an output audio signal corresponding to the input audio signal over the communication connection when the wireless communication connection is established. Related aspects also are described.

21 Claims, 9 Drawing Sheets

HYBRID ROUTING FOR HANDS-FREE VOICE ASSISTANT, AND RELATED SYSTEMS AND METHODS

CROSS-REFERENCE TO RELATED APPLICATIONS

This application claims the benefit of priority to U.S. Provisional Patent Application No. 62/854,157, entitled "HYBRID ROUTING FOR HANDS-FREE VOICE ASSISTANT, AND RELATED SYSTEMS AND METHODS," filed May 29, 2019, the disclosure of which is hereby incorporated herein in its entirety.

FIELD

This application and related subject matter (collectively referred to as the "disclosure") generally concerns speech-controllable appliances, their communications with external devices, and related systems and methods. More particularly, but not exclusively, this disclosure pertains to speech-controllable appliances communicating with external devices in parallel with receiving and processing speech input, providing a hybrid routing for a hands-free voice assistant.

BACKGROUND INFORMATION

Recently, a number of speech-controllable appliances have become commercially available. Such devices can typically perform a number of tasks in response to commands uttered by a user and generally have made interacting with machines, such as, for example, smart speakers, computers, mobile devices, navigation systems, automobiles, and other computing environments, more natural than, for example, using tactile or keyed input. In principle, such appliances acquire sound from an acoustic scene, extract information (e.g., a command) from the acquired sound, and respond to the extracted information.

Increasingly, mobile communication devices (e.g., smart phones) and other devices are able to communicate with external systems such as, for example, automobile sound systems (sometimes referred to in the art as "head units"). Consequently, users can interact with the mobile communication device and/or applications on the automobile in a hands-free manner. For example, a smartphone can output and receive audio over a communication link with an automobile sound system when making and accepting telephone calls, searching for and navigating to map locations, or selecting and playing music.

SUMMARY

Users of presently available mobile-communication devices and other speech-controllable appliances can experience a delay between issuing an activation command to a speech-controllable appliance and hearing an audible response over an external system. In some instances, it may take up to between about 5 seconds and about 7 seconds to establish wireless communication between the speech-controllable appliance and the external system. Consequently, the time needed to establish a communication link between the speech-controllable appliance and the external system results in a delay before the appliance can receive voiced commands over the communication link with the external system.

Concepts, systems, methods, and apparatus disclosed herein may overcome problems of previous approaches. As but one illustrative example, such appliances may open a bi-directional wireless communication channel with an external device, responsive to an activation command for the speech-controllable features, while immediately, and in parallel with, receiving and processing utterances that include commands for the speech-controllable features.

In some respects, concepts disclosed herein generally concern appliances having a microphone, a processor, and a memory. The memory contains instructions that, when executed by the processor, cause the respective appliance, responsive to an activation input, to receive an input audio signal via the microphone transducer and, in parallel therewith, initiate a bi-directional, wireless communication connection with an external device; and transmit an output audio signal corresponding to the input audio signal over the communication connection when the wireless communication connection is established.

The memory can contain further instructions. Some instructions can cause the appliance to determine that the wireless communication connection has been established prior to causing the appliance to output the output audio signal over the wireless communication connection.

Some instructions can cause the appliance to initiate an automatic speech recognition (ASR) task on the input audio signal; and to generate the output audio signal according to recognized speech received from the ASR task. The instructions to initiate an ASR task can cause the appliance to record an input audio signal generated by the microphone transducer; transmit the input audio signal to an ASR engine; and receive recognized speech from the ASR engine.

Some instructions can cause the appliance to invoke a task responsive to the recognized speech and to generate an output audio signal corresponding to the invoked task. The instructions can cause the appliance to initiate the ASR task at an ASR engine local to the appliance, or at an ASR engine remote from the appliance.

Some instructions can cause the appliance to receive a second input audio signal over the wireless communication connection and to transmit the second input audio signal to an ASR engine.

Some instructions can cause the appliance to receive a first input audio signal from the microphone transducer; receive a second input audio signal over the wireless communication connection; and transmit, to an ASR engine, the first input audio signal, the second input audio signal, or a combination thereof.

Some instructions can cause the appliance to determine a measure of audio quality for the first input audio signal and a measure of audio quality of the second input audio signal. The audio quality can correspond to an ordered range of values, wherein the values at one end of the range indicate worse audio quality and the values at the other end of the range indicate better audio quality. The instructions can cause the appliance to select the input audio signal having the measure indicative of better audio quality; and transmit the selected input audio signal to the ASR engine.

Some instructions can cause the appliance to transmit an input audio signal to an ASR engine, wherein the input audio signal is received from the microphone transducer or over the wireless communication connection.

Some instructions can cause the appliance to determine that the wireless communication connection is established and to receive the input audio signal over the wireless communication connection responsive to that determination.

In other respects, an electronic apparatus can have an audio acquisition module comprising a microphone transducer and configured, responsive to detecting an activation input, to record an input audio signal corresponding to sound received by the microphone transducer. The electronic apparatus can have an audio processing module configured to determine recognized speech corresponding to the input audio signal; and a command processing component configured to process the recognized speech to identify a task, and to execute the task, wherein an audio response is generated based on execution of the task. The electronic apparatus can have a communication coordinator configured to: open a bi-directional wireless communication connection to an external device, responsive to detecting the activation command, and in parallel with the recording of the input audio signal; and transmit the generated audio response to the external device over the bi-directional wireless communication connection.

The communication coordinator can buffer the audio response when the bi-directional wireless communication connection is not yet established.

The audio processing module can receive a second input audio signal over the wireless communication connection, combine the second input audio signal with the recorded input audio signal, and obtain recognized speech from the combined signal.

The audio processing module can receive a second input audio signal over the wireless communication connection, and compare the second input audio signal with the recorded input audio signal according to a measure of audio quality. The audio quality can correspond to an ordered range of values, where the values at one end of the range indicate worse audio quality and the values at the other end of the range indicate better audio quality. The audio processing module can select the input audio signal having the measure indicative of better audio quality, and obtain recognized speech from the selected input audio signal.

The audio processing module can obtain recognized speech from a local speech recognition engine, or from a remote speech recognition engine.

The electronic apparatus can include an application, wherein the command processing component is configured to cause the application to execute the task.

Also disclosed are associated methods, as well as tangible, non-transitory computer-readable media including computer executable instructions that, when executed, cause a computing environment to implement one or more methods disclosed herein. Digital signal processors embodied in software, firmware, or hardware and being suitable for implementing such instructions also are disclosed.

In other respects, an appliance has an audio acquisition module to emit a digital signal corresponding to an acoustic signal received by the audio acquisition module. For example, the audio acquisition module can include a microphone transducer, an analog filter or other signal conditioner, and an analog-to-digital converter to sample an analog output from the microphone.

Also disclosed are associated methods, as well as tangible, non-transitory computer-readable media including computer executable instructions that, when executed, cause a computing environment to implement one or more methods disclosed herein. Digital signal processors embodied in software, firmware, or hardware and being suitable for implementing such instructions also are disclosed.

The foregoing and other features and advantages will become more apparent from the following detailed description, which proceeds with reference to the accompanying drawings.

BRIEF DESCRIPTION OF THE DRAWINGS

Referring to the drawings, wherein like numerals refer to like parts throughout the several views and this specification, aspects of presently disclosed principles are illustrated by way of example, and not by way of limitation.

DETAILED DESCRIPTION

Figure 1:
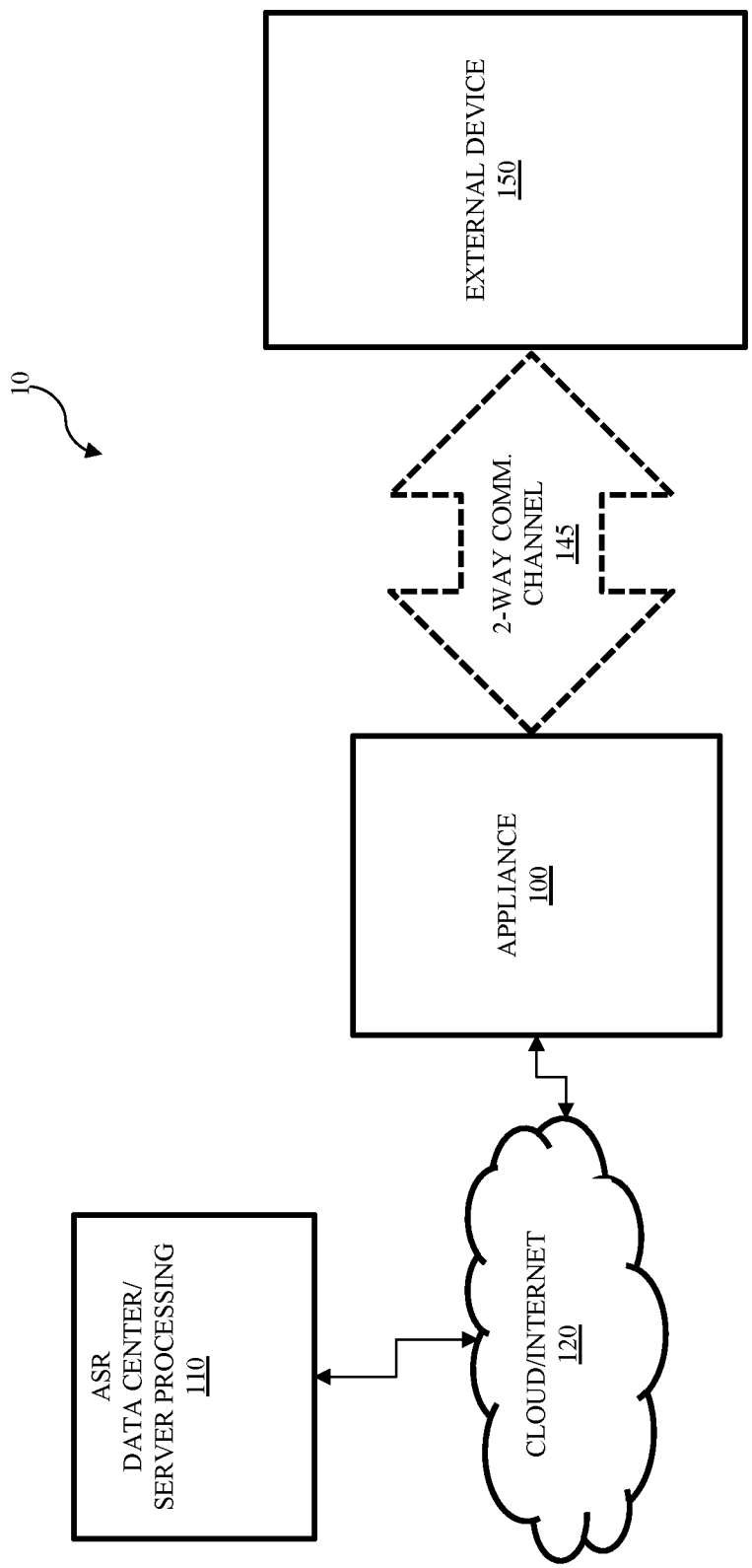
FIG. 1 illustrates an example of a system that allows hands-free communication with an appliance and an external device.

The following describes various principles related to speech-controllable appliances and their communication with external devices. For example, some disclosed principles pertain to systems, methods, and components to improve responsiveness of speech-controllable appliances when receiving voiced commands and establishing a communication channel with an external device. That said, descriptions herein of specific appliance, apparatus or system configurations, and specific combinations of method acts, are but particular examples of contemplated appliances, components, systems, and methods chosen as being convenient illustrative examples of disclosed principles. One or more of the disclosed principles can be incorporated in various other appliances, components, systems, and methods to achieve any of a variety of corresponding, desired characteristics. Thus, a person of ordinary skill in the art, following a review of this disclosure, will appreciate that appliances, components, systems, and methods having attributes that are different from those specific examples discussed herein can embody one or more presently disclosed principles, and can be used in applications not described herein in detail. Such alternative embodiments also fall within the scope of this disclosure.

I. Overview

Many speech-controllable appliances operate in a two-phase manner, with the first phase being an activation phase and the second phase being a command, or a task, phase. For example, during the activation phase, a specified activation input (e.g., a user's utterance, gesture, keystroke, or tactile input) can activate a given appliance and cause it to listen for a user's utterance (which could be a command to invoke a task). To maintain user privacy and for a variety of other reasons, many appliances carry out only a limited number of tasks during the activation phase. By way of example, some appliances remain in a low-power, sleep-like mode that places most system components into an inoperable or a limited-operation state. In that type of mode, an appliance configured to receive a user's utterance, for example, can continuously overwrite a short, circular buffer with acquired sound until the appliance detects an activation phrase within the buffered sound.

Once the appliance detects activation by the user, for example, with a button press on the appliance, or when an activation command is recognized, the appliance can "awaken" to enter the second, e.g., task-execution, mode of operation. During the command or task-execution phase, the appliance can receive and, responsive thereto, execute, any of a variety of uttered commands, or otherwise carry out a task responsive to information extracted from ambient sound. Other appliances do not acquire any ambient sounds until a user invokes another mode of activation, as through touch or other input. And, some appliances do not invoke the first phase of operation, instead remaining in the task-execution mode of operation.

In a task-execution phase, the appliance acquires ambient sound, transmits signal content corresponding to the ambient sound to a speech-recognition system or other information-extraction module, and responds to one or more ascertained commands extracted by the speech-recognition or other information-extraction module.

As an example, several appliances available from Apple Inc., of Cupertino, Calif., can be activated by a user who utters "Hey, Siri." Once activated, such an appliance can execute any of a variety of uttered commands, including, by way of example, queuing up and playing a song responsive to an uttered command to play the song, or looking up and providing a weather forecast for a location and date.

An appliance can communicate with an external device with a uni-directional wireless communication channel, for example, for streaming music or otherwise transmitting audio from the appliance to the external device for playback on the external device's speakers. One example of a uni-directional wireless communication protocol is the Advanced Audio Distribution Profile (A2DP), which is a BLUETOOTH® communication protocol. However, uni-directional communication protocols do not typically support receiving sound by an external device and transmitting audio data corresponding to the sound to a speech-controllable appliance.

Nonetheless, an appliance can communicate with an external device over a bi-directional wireless communication link, for example, to conduct a hands-free telephone call, or to use voice commands received by the external device to interact with a voice recognition system operating on the appliance. Examples of a bi-directional wireless communication protocol include, without limitation, the Hands-Free Profile (HFP) and the Headset Profile (HSP), both of which are BLUETOOTH® communication protocols. A bi-directional wireless communication channel may take relatively longer to establish than a uni-directional wireless communication channel.

Regardless, some disclosed principles allow a speech-controllable appliance to record sound, e.g., using an on-appliance microphone, and to process speech in parallel with establishing a wireless communication link with an external device. For example, a user can utter an activation command or otherwise provide an activation input to a speech-controllable appliance. In response to the activation input, the appliance can initiate two tasks in parallel: (1) initiate bi-directional communication with an external device; and (2) initiate a speech-recognition task, as by, for example, recording sound observed by an on-appliance microphone and communicating the recorded sound to a speech-recognition engine. Subsequently, the appliance can output over the external device audio corresponding to the speech-recognition task or another task invoked by the speech-recognition task. By initiating external communication in parallel with speech recognition, the delay experienced by a user between issuing an activation command and receiving a response over an external device can be substantially reduced compared to conducting those operations in series.

FIG. 1 illustrates an example of a system 10 that allows hands-free communication with an appliance 100 and an external device 150. The appliance 100 may be, for example, a mobile-communications device such as for example a smartphone or tablet computer. The external device 150 may be, for example, a wireless speaker, an automobile head unit, a wireless wearable earpiece, or a smart appliance.

The appliance 100 may be configured to communicate with the external device 150, for example, by establishing one or more types of communication channels with the external device 150. As illustrated, the appliance 100 may establish and maintain a bi-directional wired or wireless communication channel 145 with the external device 150. The appliance 100 may, at other times, establish and maintain a uni-directional wired or wireless communication channel. At still other times, the appliance 100 and the external device 150 may not be communicatively connected.

The appliance 100 may be configured to perform speech recognition tasks on utterances received via an onboard or communicatively-coupled microphone. The appliance 100 may be configured to request speech recognition, and received recognized speech, from a remote automatic speech recognition (ASR)/server processing system 110, using a connection to the Internet 120, e.g., to a cloud-based system. In some examples, the appliance 100 may perform some speech recognition (SR) tasks locally, while requesting other SR tasks from the remote ASR system. In some examples, the appliance 100 may perform all SR tasks locally, without requesting any tasks from the remote ASR system.

It may be desirable in some circumstances for the appliance 100 to perform a task responsive to receiving recognized speech that contains a spoken command or request. Performing the task may generate or retrieve audio information. Examples of such tasks include, without limitation, searching locally stored information, searching a remote source for information, initiating playback of a music or video file, getting directions to a map location, initiating a phone call, initiating a text message, and so forth.

When the appliance 100 is in communication with the external device 150, the appliance may transmit audio information received or generated by the appliance to the external device. The external device, in turn, can output audio using speakers associated with the external device (e.g., car speakers). Stated differently, the appliance 100 can output audio over the external device 150 rather than through speakers included in the appliance.

In a conventional system, there may be a delay between a time when the user provides an activation input to the appliance and the time when the appliance is ready to receive an utterance, particularly when a communication with an external device needs to be established. In a conventional system, the activation input typically causes the appliance to establish communication, e.g., bi-directional communication, with the external device. Subsequent to establishing bi-directional communication, a conventional appliance typically emits a tone or other audio output through the external device (e.g., over the communication link with the external device, which then processes and outputs audio through associated speakers), as to indicate to a user that the appliance is ready to receive an utterance. However, such a sequential order of operations can introduce substantial and unnatural delay in the user's experience, for example, due to the length of time needed to establish a bi-directional communication channel with the external device. The delay may require that the user wait until the communication channel is established before uttering the command. In some cases, the user may start uttering the command before the appliance is ready to receive it. As a consequence, the appliance may only receive part or even none of the user's premature utterance, resulting in an incomplete or an unsatisfactory response by the appliance to the user's utterance, as well as a frustrating user experience.

Establishing a uni-directional communication channel with the external device may partially address this situation. For example, establishing a uni-directional communication link, e.g., using A2DP, may take less time than establishing a bi-directional communication link, e.g., using HSP or HFP. Thus, using A2DP could, in theory, allow a user to begin making an utterance sooner than when using a counterpart bi-directional protocol (e.g., HFP or HSP). This approach, however, still may not offer satisfactory results in some use situations. For example, the HFP and the HSP protocols, and other bi-directional communication protocols, can interrupt a current task on an external device, whereas A2DP, in contrast, does not. Consequently, if the external device is presently playing audio from a given source, the act of establishing uni-directional communication between the appliance and the external device may not cause the external device to output audio from the appliance. By contrast, the HFP and the HSP protocols, and other bi-directional communication protocols, can cause the external device to switch inputs, permitting the external device to receive audio from the appliance and to playback the audio over speakers associated with the external device.

Accordingly, embodiments of principles disclosed herein can improve on a user's experience with hands-free communication and control of speech-controllable appliances in conjunction with external devices, as by reducing a delay between providing an activation input to the appliance and the time when the appliance is ready for the user to utter a command.

II. Parallelization of Tasks

FIGS. 2-6 illustrate process flows that may be performed by an appliance, such as, for example, appliance 100, when a processor on the appliance executes instructions. More particularly, stored instructions can, when executed by a processor associated with an appliance, cause the appliance to carry out the illustrated process flow.

Figure 2:
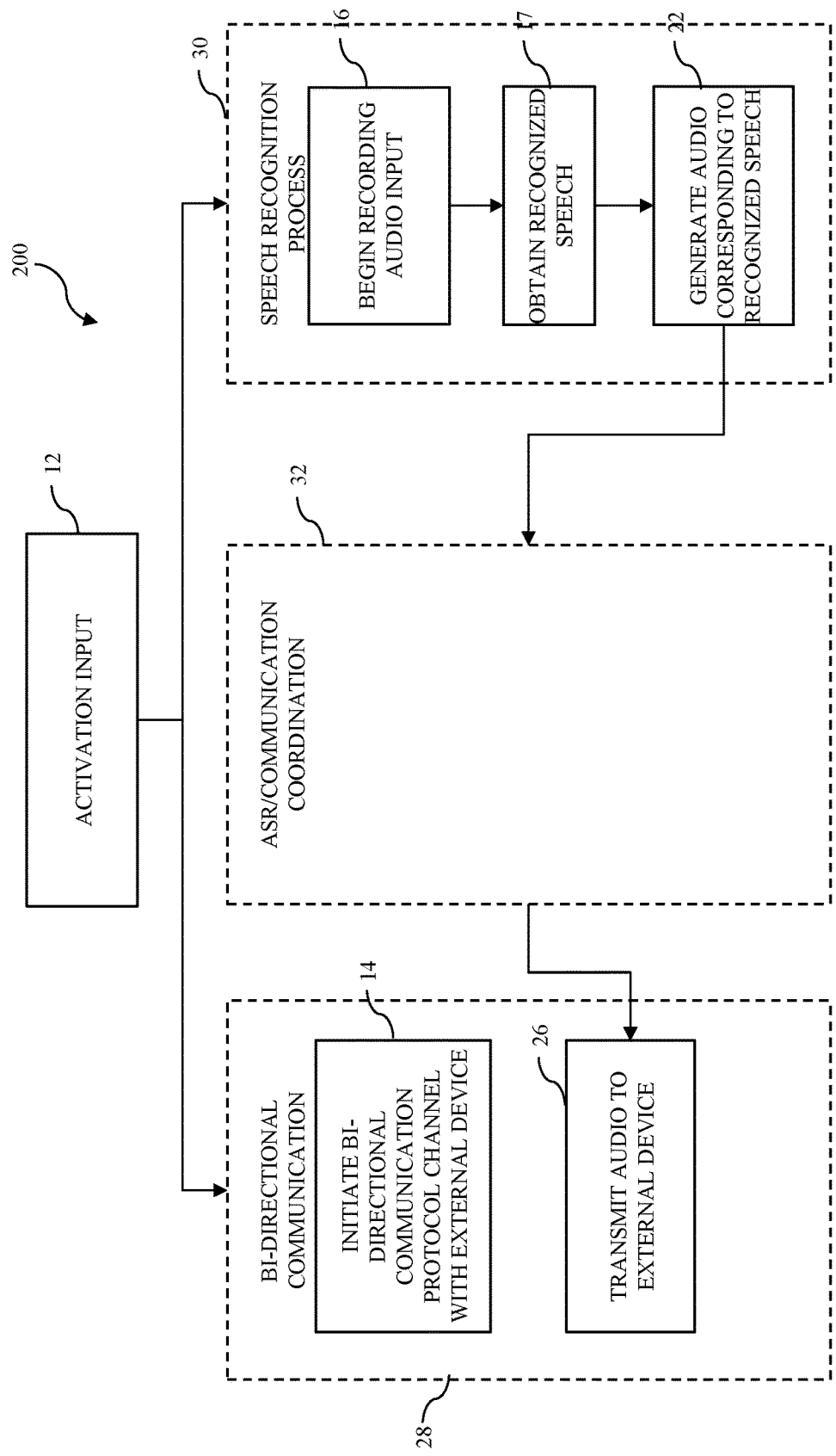
FIG. 2 illustrates an overview of a process flow for establishing a bi-directional wireless communication channel in parallel with listening for and responding to utterances that include commands or requests, for a system as in FIG. 1.

FIG. 2 illustrates an overview of a process flow 200 for establishing a bi-directional wireless communication channel, or link, in parallel with performing a speech recognition task, e.g., listening for and responding to user-uttered commands or requests. By way of illustration, the process can begin when the appliance receives an activation input 12. The activation input 12 may include, for example, a button-press on the appliance, or detection of an uttered activation command.

Responsive to the activation input, the appliance can initiate a speech recognition process 30. Also responsive to the activation input, the appliance may initiate a communication process 28 to establish a bi-directional link (e.g., open a bi-directional, wireless-communication channel ("bi-directional channel") with an external device. The process 28 may execute in parallel with SR process 30, as to impose less delay on a user than when the processes 28, 30 are performed serially.

In the SR process 30, the appliance may begin receiving sound with a microphone on the appliance and recording a corresponding audio signal at block 16, independently of whether the bi-directional channel is yet established. The appliance may then obtain recognized speech from any utterances identified in the audio input signal, at block 17. The operation of block 17 may also occur independently of whether the bi-directional channel is yet established. As used herein throughout, recognized speech can be the result of a speech recognition process performed on the utterances, and may include a human-language transcription of the utterance, e.g., a string of text, and/or a machine-language representation of an utterance, e.g., instructions to invoke and perform a task corresponding to the utterance.

The appliance may then perform one or more tasks responsive to the recognized speech including, for example, generate an audio output signal comprising audio information responsive to the recognized speech, at block 22. For example, the audio output signal can correspond directly to the recognized speech, or it can correspond to an output of a task performed by the appliance responsive to the recognized speech (e.g., the SR system can return a command, the command can invoke a task, and execution of the task can cause the appliance to generate or to receive audio that can be played back locally or over the external device). The audio information may include, for example and without limitation, a response to a query, a prompt to begin dictation of a message, or confirmation that the appliance completed a task related to the recognized speech. The operations of the SR process 30 are described further below, for example, with respect to FIG. 7.

In parallel with the SR process 30, the appliance may initiate the establishment of a bi-directional channel with the external device, at block 14. The process of establishing the channel is generally protocol-dependent, and may include, for example, various handshakes, exchanges of encryption information, and other data exchanges to allow the two devices to send and receive information over the channel.

The appliance may use a coordination process 32 to align (or coordinate) the output of audio information from block 22 with the establishment of the bi-directional channel. For example, if audio information is available before the channel is established, the coordination process 32 may buffer or otherwise store the audio information until the channel is established and available. Once the channel is available, the appliance may use the channel to transmit the audio information to the external device, at block 26. Alternatively, if the channel is established and available before the audio information is available, the coordination process 32 may pass the audio information (or allow the audio information to pass) to a communication interface connected with the channel once the audio information becomes available.

Establishing a bi-directional channel with the external device provides some advantages over the use of a uni-directional channel. When the bi-directional channel is established, it can cause the external device to switch from another source of audio input to the input from the channel, e.g., muting the radio, closing a uni-directional channel, or pausing playback of a compact disc. If the audio output system is turned off, the establishment of the bi-directional channel can turn it on. Establishment of a uni-directional wireless link, in theory, could also cause the external device to switch from another input source to the input received over the wireless link. However, the A2DP protocol does not invoke source switching, unlike the HSP and the HFP protocols. Thus, as a practical matter, when using available BLUETOOTH® protocols to implement the process 28, establishing bi-directional communication with the external device can provide an improved user experience compared to establishing a uni-directional communication link.

Additional and alternative embodiments of the processes 28, 30, and 32 are described below.

Figure 3:
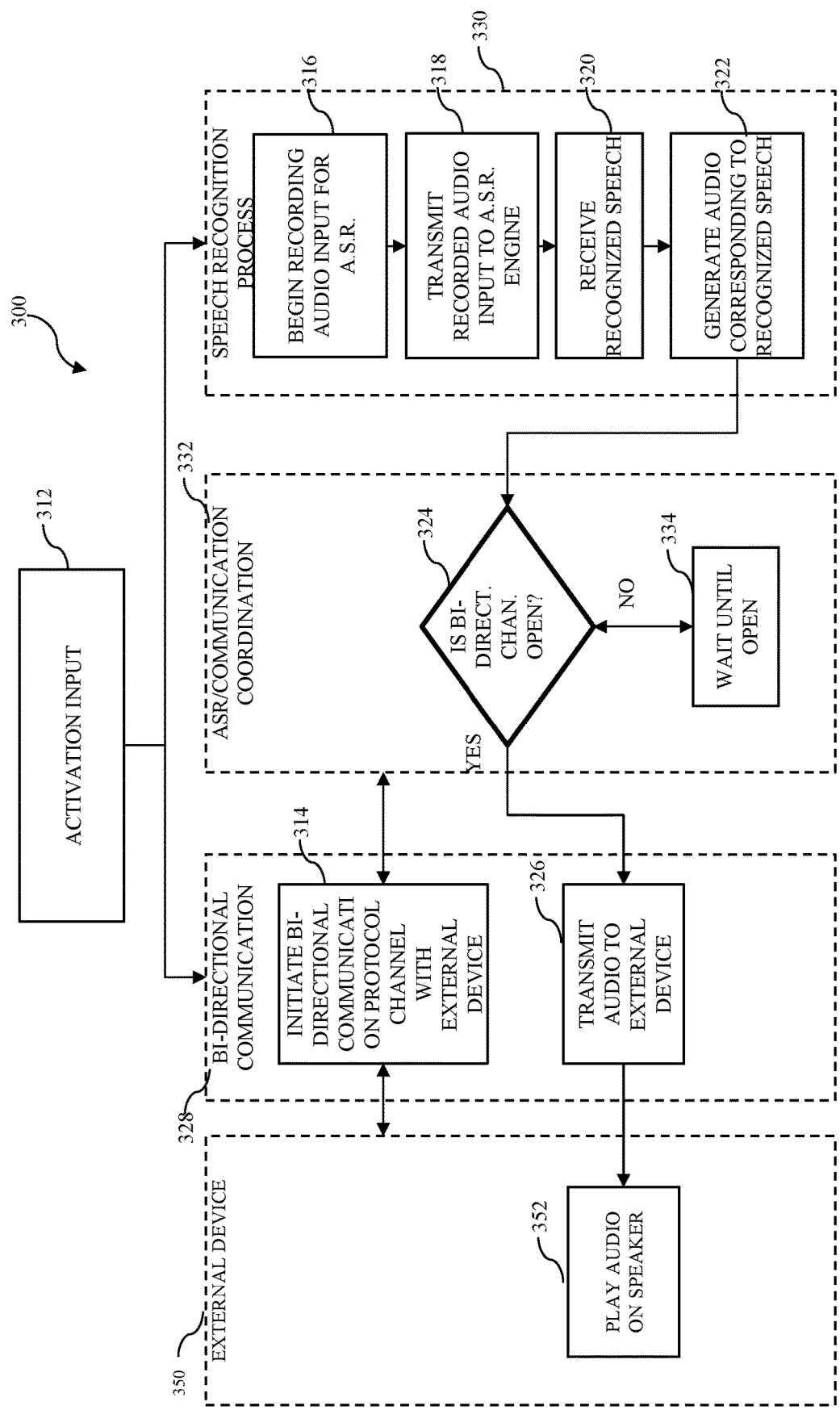
FIG. 3 illustrates a variation of the process flow shown in FIG. 2.

FIG. 3 illustrates a process flow 300, which may be a variation of the process flow 200. As with the process flow 200, the process flow 300 initiates the process 328 in parallel with a SR process 330, responsive to receiving an activation input 312. The SR process 330 may start with recording audio input at block 316. On some appliances, as described above, responsive to the activation input, the appliance may switch from an activation mode having limited or no speech-recognition capacity to a task-execution mode allowing additional or more sound-recording and/or speech-recognition capacity than in the activation mode. On other appliances, e.g., without a separate, activation mode providing limited task-processing capability, an execution phase may begin responsive to the activation input 312 (e.g., without switching from a separate activation mode having limited task-processing capabilities). In either event, the microphone transducer may be (or remain) activated, and recording may begin in a manner suitable for a task-execution mode of operation.

The appliance may transmit the recorded audio input to an automatic speech recognition (ASR) engine at block 318. The ASR engine may be local to the appliance, or may be remote from the appliance. In some appliances, the audio input signal may be processed before the (processed) audio input is sent to the ASR engine. For example, after recording and sampling, and before presenting the recorded audio input of the utterance to the ASR engine, characteristics of the observed utterance and any impairment signals can be manipulated. For example, one or more echo cancelers, echo-suppressors, noise-suppressors, de-reverberation techniques, linear-filters (EQs), and combinations thereof, can be applied to the recorded audio input. A communication connection to the ASR engine may encode the recorded audio input prior to transmission.

The appliance may receive recognized speech from the ASR engine at block 320. In one aspect, the recognized speech may be in the form of human-readable text corresponding to an utterance detected in the audio input. In some instances, the recognized speech may be processed to generate instructions for the appliance to execute a task related to the detected utterance.

The appliance may generate audio information corresponding to the recognized speech in block 322. When the recognized speech corresponds to a task command that the appliance understands, the appliance may execute the task command, and the result of the executed task may be or include audio information.

In some instances, the audio information may comprise a sound, a tone, generated speech, or other audio, as to provide confirmation to a user that the task was performed. For example, if the user's utterance is "Remind me to call mom tonight at 8," a corresponding task command may invoke a task of creating a reminder for the user, e.g., setting a reminder to alert the user at a specific date and time (e.g., 8 pm on today's date) with text relevant to the reminder (e.g., "Call mom"). The audio information generated from such a task may include a sound such as a chime, or spoken confirmation that the reminder was set, such as "Ok, I'll remind you to call mom at 8 tonight" or "Ok, the reminder is set."

In other instances, the audio information may comprise generated speech corresponding to the result of a search or query. For example, if the user's utterance is "How hot is it going to be today?", a corresponding task command may invoke a look-up of the projected high temperature at the user's location from a weather service. The audio information generated from the look-up may include generated speech that indicates the projected high temperature, e.g., "86 degrees", and may include additional speech to make the response more conversational, e.g., "It's going to get up to 86 degrees today."

In some instances, the process 330 may indicate to a coordination process 332 that audio information has been generated. In other instances, the audio information generated in block 322 may be pushed to the coordination process 332 without a prior indication that the audio information was generated. The coordination process 332 may determine whether the bi-directional channel has been established and is open at block 324. The coordination process 332 may, for example, query the process 328, or may receive a notification from the process 328 when the channel becomes available (not shown). When the channel is available, the audio information from block 322 may be transmitted to the external device 350 using the channel in block 326. The external device 350 may then play the audio information through its speaker(s) at block 352.

When the channel is not yet open, the coordination process 332 may wait until the channel is open, at block 334. The audio information may be buffered or stored, either by the process 330 or by the coordination process 332, until the channel is open. Alternatively, in some instances, the coordination process 332 may cause the audio information to be played on the appliance's speaker (not shown).

The appliance or the external device may close the bi-directional channel (not shown), e.g., when a telephone call is ended, or when a speech-control interaction is completed or canceled. In an embodiment, the bi-directional channel may be closed by the coordination process 332, for example, after some period of time has elapsed from a last detected utterance or from an output of audio information. The period of time may be about 2 seconds, e.g., between about 0.5 seconds and about 2.5 seconds, such as, for example, between about 1 second and about 1.5. seconds. In some instances, the bi-directional channel may be closed after receiving a user utterance that indicates that no further interactions are needed. For example, after the system receives and reads a text message aloud to the user, the system may generate audio information that asks the user if they wish to respond to the message. If the user says "no", the system may recognize the user's response, and may execute a task of closing the bi-directional channel in response. In some instances, audio information may be generated and output as an indication to the user that the connection is closed. In some instances, the external device may revert to a previous audio source for output by its speakers when the connection is closed, for example, if the radio had been playing prior to establishment of the bi-directional channel, then the external device may resume playing the radio when the channel is closed.

Figure 4:
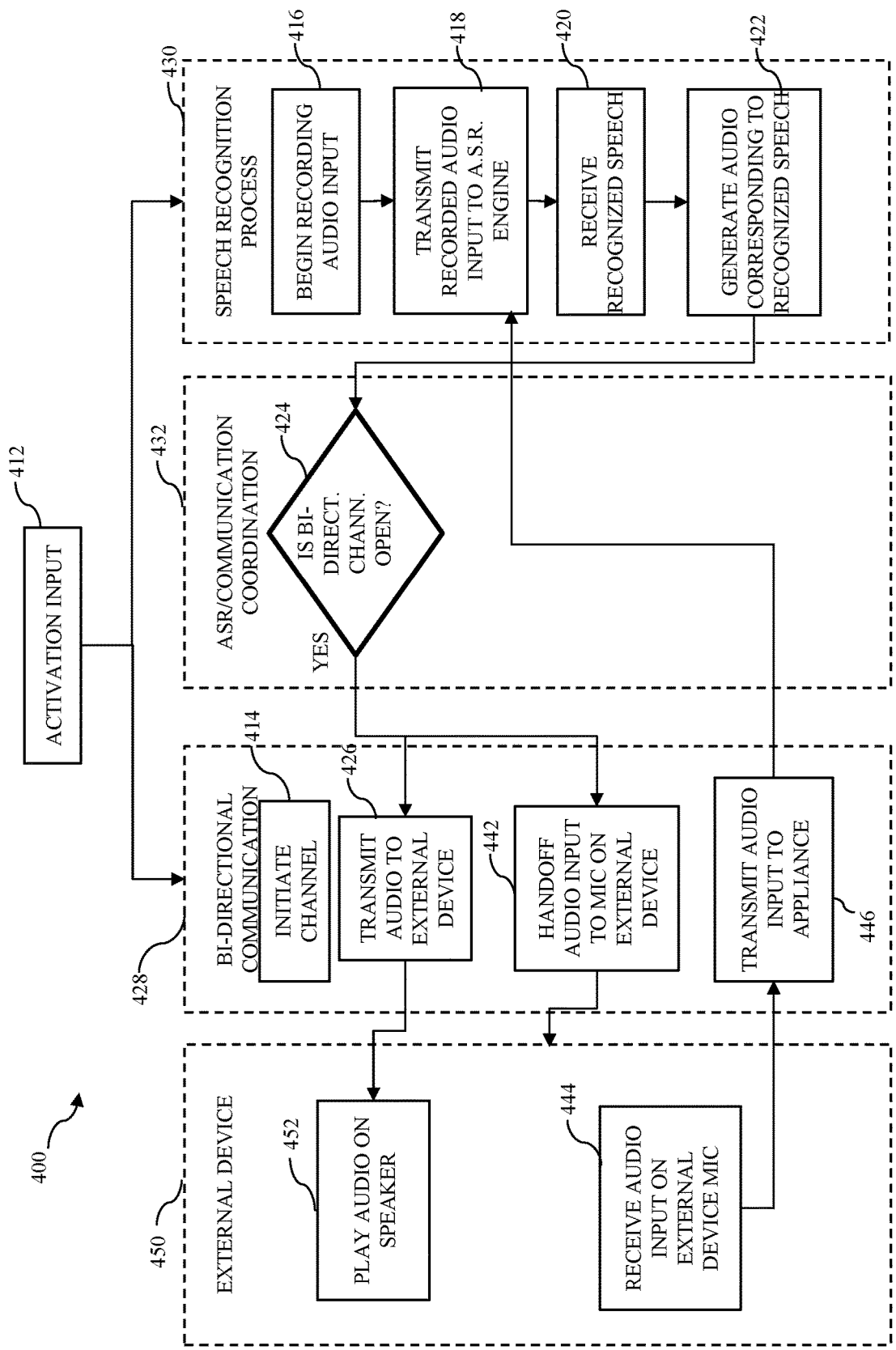
FIG. 4 illustrates a process that includes handing off recording functions to an external device once a bi-directional channel is established.

FIG. 4 illustrates a parallel process 400 similar to the processes 200 and 300. The process 400 includes a hand-off of recording functions to an external device once a bi-directional channel is established. It may be desirable to hand off the recording operations to the external device microphone, for example, if the external device microphone is of high quality, or when it is believed to be or expected to be better positioned, relative to the user's mouth, than the appliance microphone.

The process 400 may begin similarly to the processes 200 and 300, e.g., responsive to receiving an activation input 412, an SR process 430 can be initiated in parallel with initiating establishment of a bi-directional channel 428. When a coordination process 432 determines, at block 424, that the bi-directional communication channel is open, the coordination process 432 may then handoff audio input acquisition to a microphone on an external device 450, at block 442. For example, the coordination process 430 may transmit a signal to the external device that, when received by the external device 450, causes the external device 450 to enable audio input acquisition on its microphone. In an embodiment, the coordination process 430 may optionally disable the microphone on the appliance.

The external device 450 may then receive audio input at its microphone at block 444. The audio input received at block 444 may include a new utterance from the user, for example, responsive to a prior output of audio information, such as from block 426. The audio input received at block 444 may include a continuation of an utterance that was begun while the appliance was recording, e.g., in block 416, where the bi-directional communication channel was opened before the utterance was completed.

The external device 450 may then transmit the received audio input to the appliance, using the bi-directional channel, at block 446. The transmitted audio input may be provided to block 418, which may request speech recognition on the audio input.

Figure 5:
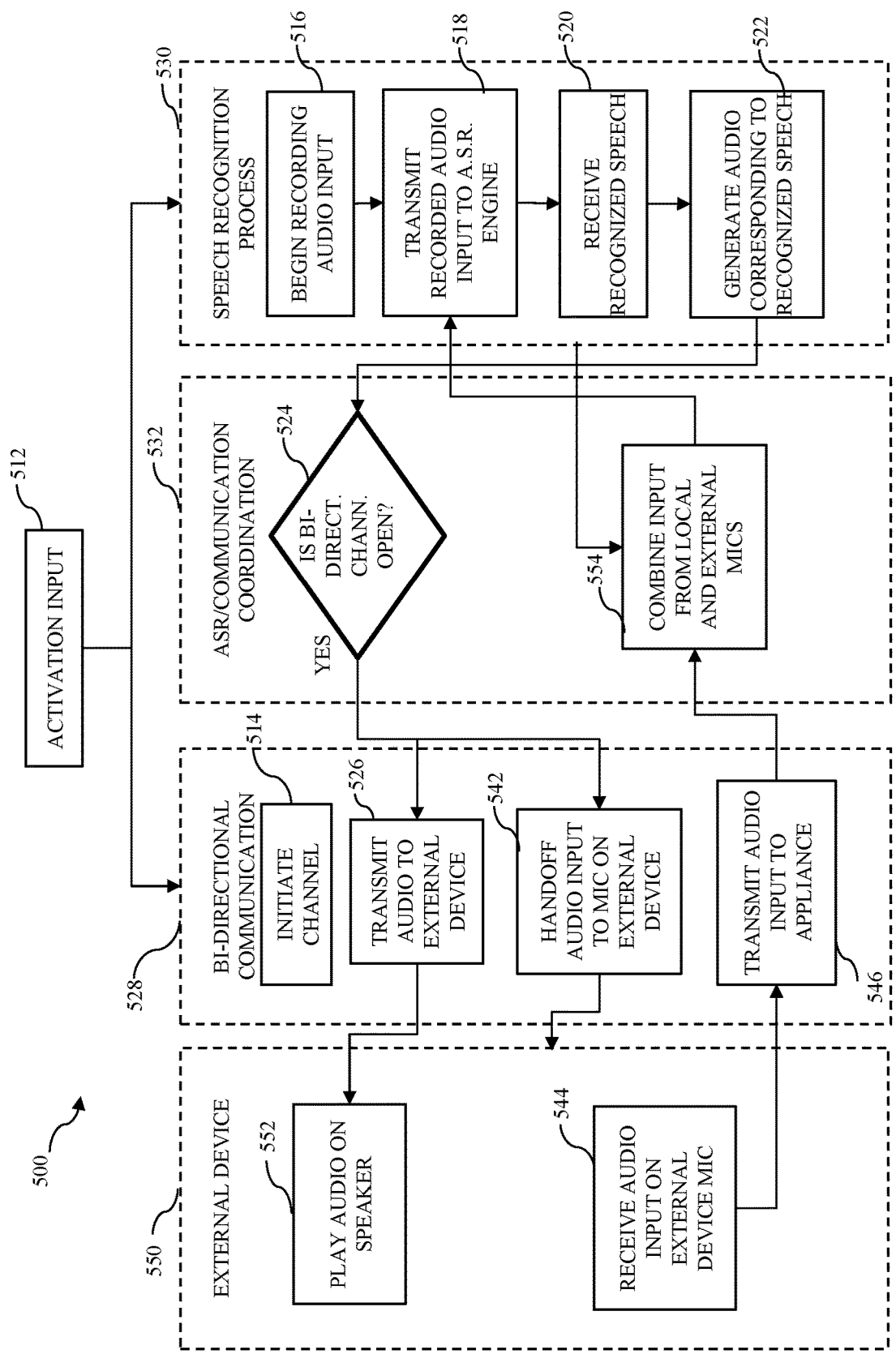
FIG. 5 illustrates a process that includes combining audio input from different input devices once a bi-directional channel is established.

FIG. 5 illustrates a process 500 similar to the processes 200, 300 and 400, that includes combining audio input from different input devices once a bi-directional channel is established. It may be desirable to combine the input audio signals from the different input devices to provide more data to an ASR engine, improve ASR results, or both.

The process 500 may begin similarly to the processes 200, 300 and 400, e.g., responsive to receiving an activation input 512, an SR process 530 may be initiated in parallel with initiating establishment of a bi-directional channel 528. The coordination process 532 may then activate a microphone on an external device 550, at block 542. For example, the coordination process 532 may transmit a signal to the external device that, when received by the external device, causes the external device to enable audio input acquisition on its microphone.

The external device 550 may then receive an input audio signal at its microphone at block 544. The input audio signal received at block 544 may include an utterance from the user, for example, responsive to a prior output of audio information, such as from block 552. The external device 550 may then transmit the received input audio signal to the appliance, using the bi-directional channel, at block 546.

The coordination process 532 may receive the audio input from the external device 550, and audio input from the appliance microphone and may combine the audio inputs into a single acoustic stream, at block 554. The coordination process 532 may temporally align (or synchronize) the two audio inputs prior to combining them. Alternatively, such alignment may occur by processing in a frequency domain.

The combined single acoustic stream may be transmitted to the ASR engine used by the appliance, in block 518 of the process 530.

Figure 6:
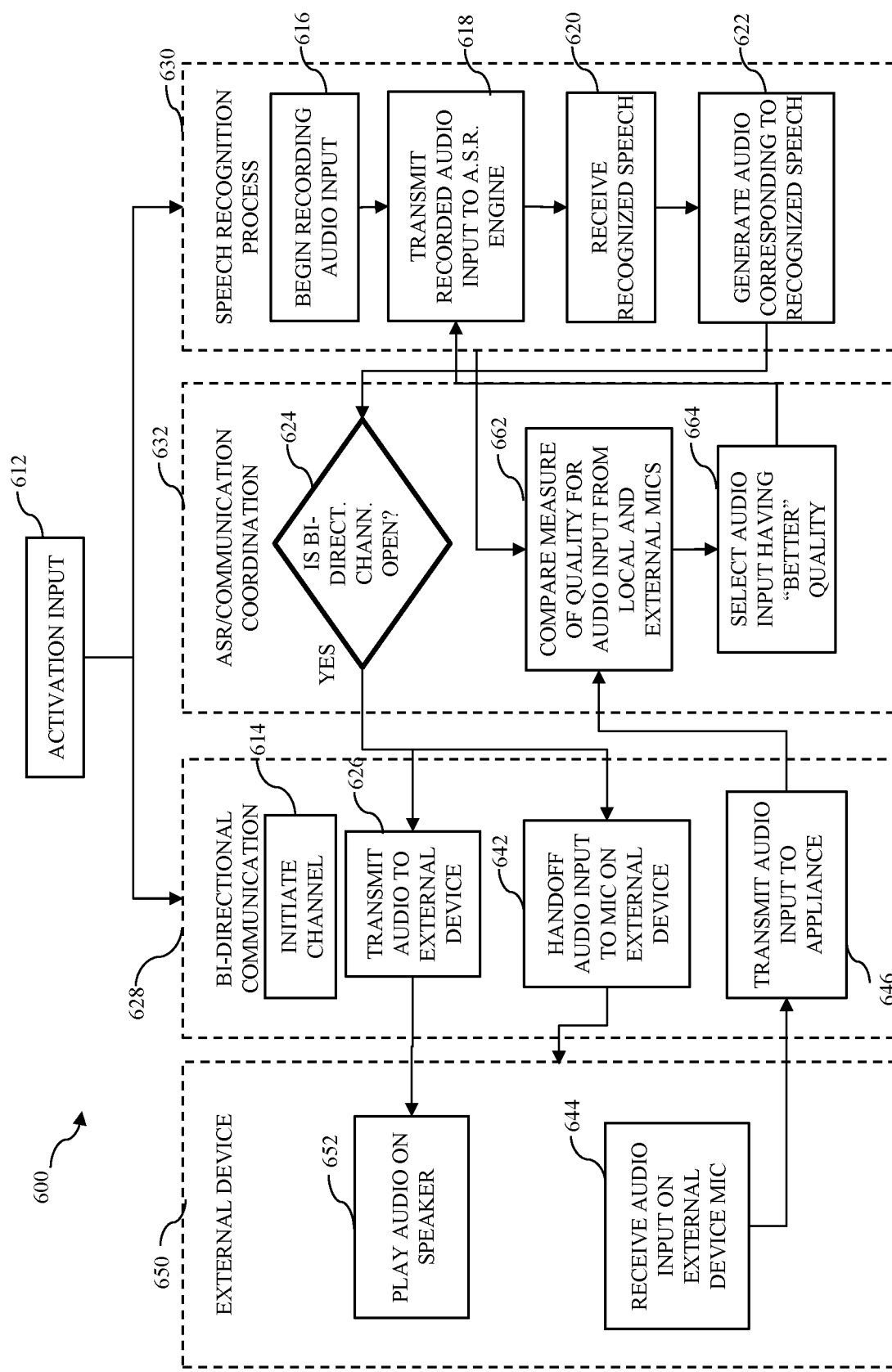
FIG. 6 illustrates a process that includes selecting audio input from different input devices once a bi-directional channel is established.

FIG. 6 illustrates a process 600, similar to the processes 200, 300, 400, and 500, that includes selecting audio input from between or among different input devices once a bi-directional channel is established.

The process 600 may begin responsive to receiving an activation input 612, where an SR process 630 is initiated in parallel with initiating establishment of a bi-directional channel 628. When the coordination process 632 determines, at block 624, that the bi-directional communication channel is open, the coordination process 632 may then activate a microphone on an external device 650, at block 652. For example, the coordination process 632 may transmit a signal to the external device 650 that, when received by the external device, causes the external device to enable audio input acquisition on its microphone.

The external device 650 may then receive an input audio signal at its microphone at block 644. The audio input received at block 644 may include an utterance from the user, for example, responsive to a prior output of audio information, such as from block 652. The external device 650 may then transmit the received input audio signal to the appliance, using the bi-directional channel, at block 646.

The coordination process 632 may receive the input audio signal from the external device 650 and audio input from the appliance microphone, and may compare the two audio input signals according to one or more measures of quality, at block 662. Generally, a measure of quality may correspond to a sequential range of values, where one end of the range represents better quality and the other end represents poorer quality. The range may be a continuous sequence, or discrete values or bins of values. For example, the coordination process 632 may compare the signal to noise ratio (SNR) of the two audio inputs. Other measures of acoustic quality may be used, such as, for example, distortion of the microphones, or frequency response of the microphones.

The coordination process 632 may select the audio input having the better quality at block 664. "Better" in this context may refer to the audio input having the measure of quality that is closer to the "better" end of the range of values relative to the measure of quality of the other audio input. For example, suppose a range of values for a measure of quality between 0 and 100, where 100 represents better quality and 0 represents poorer quality. If the measure for an audio input A is 57, and the measure for another audio input B is 72, then audio input B is of better quality and will be selected at block 664.

The selected audio input may then be transmitted to an ASR engine at block 618 of the process 630, e.g., either to an ASR engine local to the appliance or to a remote ASR engine.

III. Appliances

Figure 7:
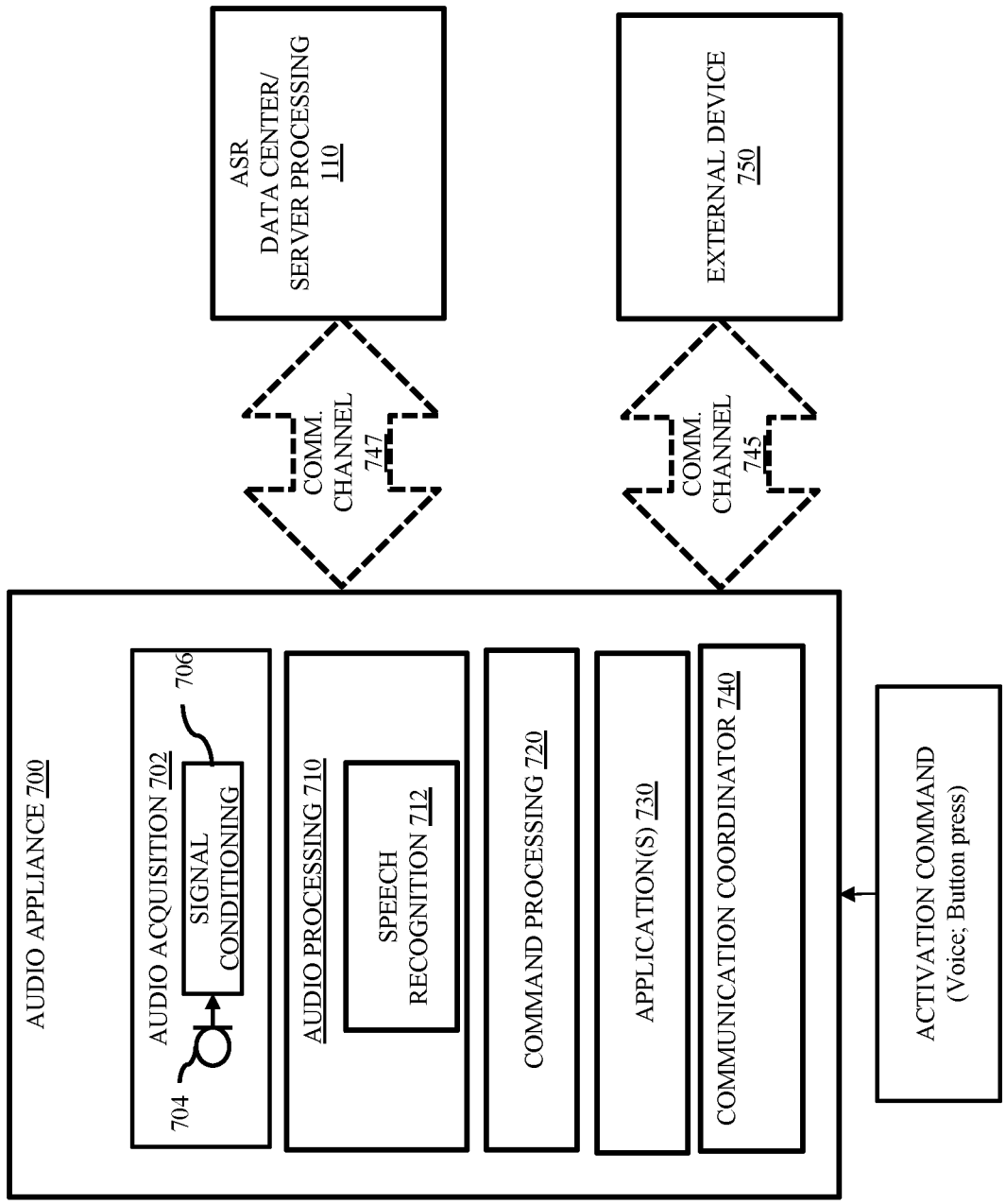
FIG. 7 illustrates an example of a suitable architecture for an appliance that can carry out one or more tasks responsive to commands uttered by a user or other information within an ambient sound field.

FIG. 7 illustrates an example of a suitable architecture for an appliance 700 that can carry out one or more tasks responsive to commands uttered by a user or other information within an ambient sound field. The appliance can also communicate with external devices, such as with external device 750.

The appliance 700 may be an example of a computing environment (e.g., described more fully below in connection with FIG. 9) that includes an audio acquisition module 702 among other aspects of a computing environment that can cause the appliance to respond to an acoustic scene in a defined manner. For example, the illustrated appliance 700 includes a processing unit and a memory (not shown) that contains instructions the processing unit can execute to cause the appliance to, e.g., carry out one or more aspects of acquiring ambient sound, extracting information from the acquired sound, and responding to the extracted information.

For example, such instructions can cause the appliance 700 to capture ambient sound with the audio acquisition module 702, generating an audio signal, and to transmit some or all of an acquired audio signal over a communication connection 747 to a remote speech-recognition system 110. The captured ambient sound could include a user's uttered command, such as, for example, "Hey, Siri. Play the song [Title]." By way of further example, the speech-recognition system can extract such an uttered command from the audio signal and transmit a machine-readable command to the appliance 700 over the communication connection 747. The command can invoke an audio codec (not shown) and/or other instructions to cause the appliance to play the song over a loudspeaker, as requested by the user.

Referring still to FIG. 7, an appliance typically includes a microphone transducer to convert incident acoustic signals to corresponding electrical output. As used herein, the terms "microphone" and "microphone transducer" are used interchangeably and mean an acoustic-to-electric transducer or sensor that converts an incident acoustic signal, or sound, into a corresponding electrical signal representative of the incident acoustic signal. Typically, the electrical signal output by the microphone is an analog signal.

Although a single microphone is depicted in FIG. 7, the use of plural microphones is contemplated by this disclosure. For example, plural microphones can be used to obtain plural distinct acoustic signals emanating from a given acoustic scene, and the plural versions can be processed independently and/or combined with one or more other versions before further processing by the appliance 700. For example, the appliance 700 may include a plurality of microphones. As well, or alternatively, the audio inputs from one or more microphones on an external device may be provided to the audio appliance and combined with, or compared to, the audio input(s) from each microphone (or a plurality of on-appliance microphones) prior to ASR processing.

As shown in FIG. 7, the audio acquisition module 702 can include a microphone transducer 704 and a signal conditioner 706 to filter or otherwise condition the acquired representation of ambient sound. Some appliances have an analog microphone transducer and a pre-amplifier to condition the signal from the microphone. Output from the pre-amplifier or other conditioner can be filtered before being sampled by an analog-to-digital converter (ADC), though the output need not be filtered prior to sampling/digital conversion.

Still referring to FIG. 7, the appliance 700 may include an audio processing component 710. The audio processing component 710 may transmit the signal from the microphone to a speech-recognition component. For example, the signal from the audio acquisition block 702 may be provided to a speech recognition engine 712 local to the appliance, or to a remote ASR engine 110. The SR engine, e.g., either the ASR engine 110 or the SR engine 712 (or both), may receive a signal corresponding to an observed utterance and may process, with a recognizer, the signal in one or more stages to obtain recognized speech corresponding to the observed utterance.

In some embodiments, the SR engine 712 or the ASR processor 110, or both, may extract speech from the utterance. The SR engine 712 and the ASR processor 110 may be identically configured. Alternatively, the SR engine 712 and the ASR processor 110 may execute different algorithms during processing, e.g., use different speech recognition models, use different probability models, and/or may comprise different hardware processors. The results from each of the SR engine 712 and the ASR processor 110 may then be compared or combined to generate recognized speech, or to provide as an input to a next stage of processing.

In addition to initiating speech recognition and receiving SR results, the audio processing component 710 may also process input audio signals prior to requesting speech recognition. For example, the audio processing component 710 may combine two or more input audio signals, e.g., from different microphones on the appliance and/or on an external device, and transmit the combined signal to an ASR engine, as discussed above with respect to block 554 in FIG. 5. The audio processing component 710 may also or alternatively compare two or more input audio signals, e.g., from different microphones, and transmit the "better" signal to an ASR engine, as discussed above with respect to blocks 662 and 664 in FIG. 6.

The SR engine may return the recognized speech and a command processing component 720 may interpret or process the recognized speech to identify a task to perform responsive to the utterance. The command processing component 720 may, for example, be a component of an operating system executing on the appliance, or a component of a speech recognition system configured to interact with the operating system and/or applications 730 on the appliance. The command processing component 720 may invoke the task or invoke software performance of the task. For example, a software application 730 may, when executed by a processor of a computing environment (e.g., FIG. 9), cause the appliance 700 to perform the task. When the task is performed, an audio response may be generated. The task itself may cause an audio response to be generated, e.g. a text-to-speech answer to a query. When the task does not inherently generate an audio response, such as when a setting is changed, the command processing component 720 may generate an audio response that indicates task completion.

In some instances, the SR engine 712 may return recognized speech in the form of a machine-readable command corresponding to a user's utterance. The command processing component 720 may execute the command, or may invoke software performance of the command. For example, responsive to an utterance of "Call Dad," the SR engine may return one or more instructions to the appliance that, when executed, cause the appliance to identify "Dad" in the user's contacts, and initiate a phone call to a phone number associated with the "Dad" contact.

The applications 730 may include software applications installed on the appliance that are configured to be responsive to commands received through the speech-recognition operations of the appliance. The applications 730 may include applications provided by the manufacturer of the appliance, by the operating system developer, and/or by third party developers.

The appliance 700 may include a communication coordinator 740. The communication coordinator 740 may execute instructions that cause the appliance to establish, maintain, and close communication channels. For example, the communication coordinator 740 may establish the bi-directional communication channel 745, responsive an activation command received at the appliance.

The communication coordinator 740 may also perform any of the processes 32, 332, 432, 532, or 632, or cause their steps to be performed, as described above. That is, generally, the communication coordinator 740 may determine whether the bi-directional channel 745 is established, and cause audio information generated as a result of command processing to be transmitted to the external device when the channel is established. When the channel is not yet established, the communication coordinator 740 may buffer or otherwise store the audio information until the channel is ready for use, or may cause the audio information to be played on the appliance's speaker. The communication coordinator 740 may transmit a signal to the external device that causes the external device to activate its microphone.

The communication coordinator 740 may cause the audio processing component 710 to combine microphone inputs, e.g., as in block 54 of process 532. The communication coordinator 740 may cause the audio processing component 710 to compare microphone inputs and select the "better" signal, e.g., as in blocks 62 and 64 of process 600.

IV. External Devices

Figure 8:
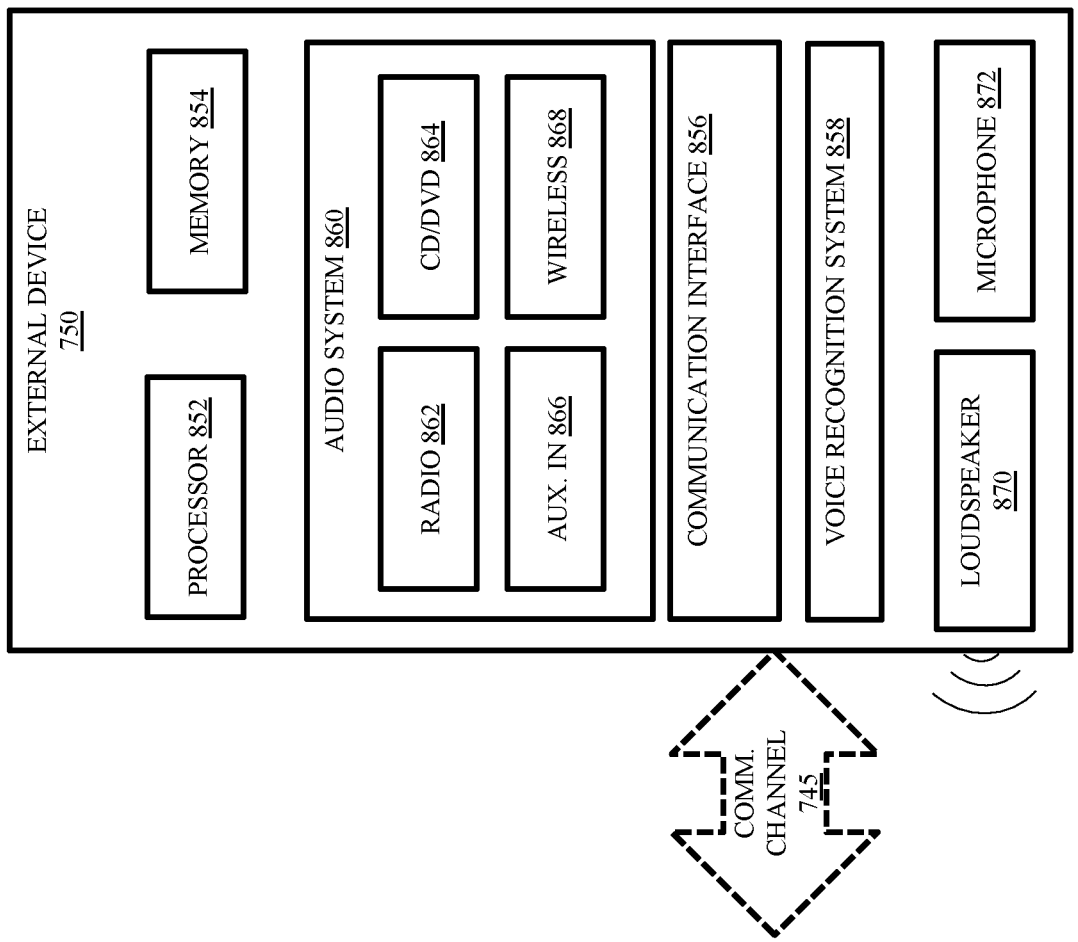
FIG. 8 illustrates a block diagram for an external device that can communicate with an appliance, and play audio information received from the appliance.

FIG. 8 illustrates a block diagram of an external device 750. The external device 750 may be, for example, an embodiment of any of the external devices 150, 250, 350, 450, 550, or 650. The external device 750 may be able to communicate with an appliance, such as appliance 100 or 700, and play audio information received from the appliance. In some instances, the external device 750 may execute one or more tasks responsive to commands uttered by a user. The external device 750 may represent, for example, a head unit on a vehicle. A vehicle head unit gives a user control over at least some the vehicle's settings, and audio media.

The external device 750 may include aspects of a computing environment (e.g., described more fully below in connection with FIG. 9), such as a processor 852, and a memory 854 that contains instructions the processor can execute to cause the external device to, e.g., change a source of audio output, recognize speech, change a setting in the vehicle, and establish communication channels.

The external device 750 may include an audio system 860. The audio system 860 may include various sources of audio data for output, such as a radio 862, e.g., FM/AM, satellite, short-wave, etc.; a compact disc (CD) and/or digital video disc (DVD) player 864; an auxiliary input 866 that may connect to an audio appliance through a wired male-to-male connection to a headphone jack; and a wireless input 868, such as a BLUETOOTH connection. The audio system 860 may include other sources (not shown), such as a wired connection to an appliance via a data port or charging port on the appliance. The audio system 860 may include a control system configured to allow the external device 750 to change which source is used for output on a loudspeaker 870, and to control playback, e.g., pause, skip, and repeat functions.

The external device 750 may include a communication interface 856. The communication interface 856 may include communication hardware and instructions that, when executed by the processor, establish, maintain, and disconnect wired and/or wireless communication channels with an appliance. For example, the communication interface 856 may participate in establishing the bi-directional wireless communication channel 745, e.g., responsive to an appliance initiating such a channel in block 14 of the process 200. Responsive to the establishment of the channel 745, the external device 750 may change the output of the audio system 860 (or turn it on, if off) from which ever source may be in use, including from a uni-directional BLUETOOTH connection, to the bi-directional communication channel 745.

The external device 750 may include a voice recognition system 858. The voice recognition system 858 may include an automatic speech recognition engine local to the external device. The voice recognition system 858 may receive a user's utterance via a microphone 872 on the external device 750, and may recognize speech from the utterance. The recognized speech may be used to control some aspect of the external device's functionality independently of any connection to an appliance, such as, but not limited to, changing a climate control setting, changing an audio system output source, selecting a particular item for playback (e.g., a track on a CD, a radio station), requesting a status on a vehicle system, enabling or disabling cruise control (not shown), or setting a destination for a navigation system (not shown). In some embodiments, the voice recognition system 858 may be configured to transmit recognized speech and/or an utterance to the appliance, for example, if the voice recognition system 858 is not configured to understand or respond to the particular recognized speech.

The external device 750 may also have one or more loudspeakers 870. The loudspeakers 870 may be used to play audio information from any of the audio system sources, including audio information received from the appliance by way of the bi-directional channel 745.

V. Computing Environments

Figure 9:
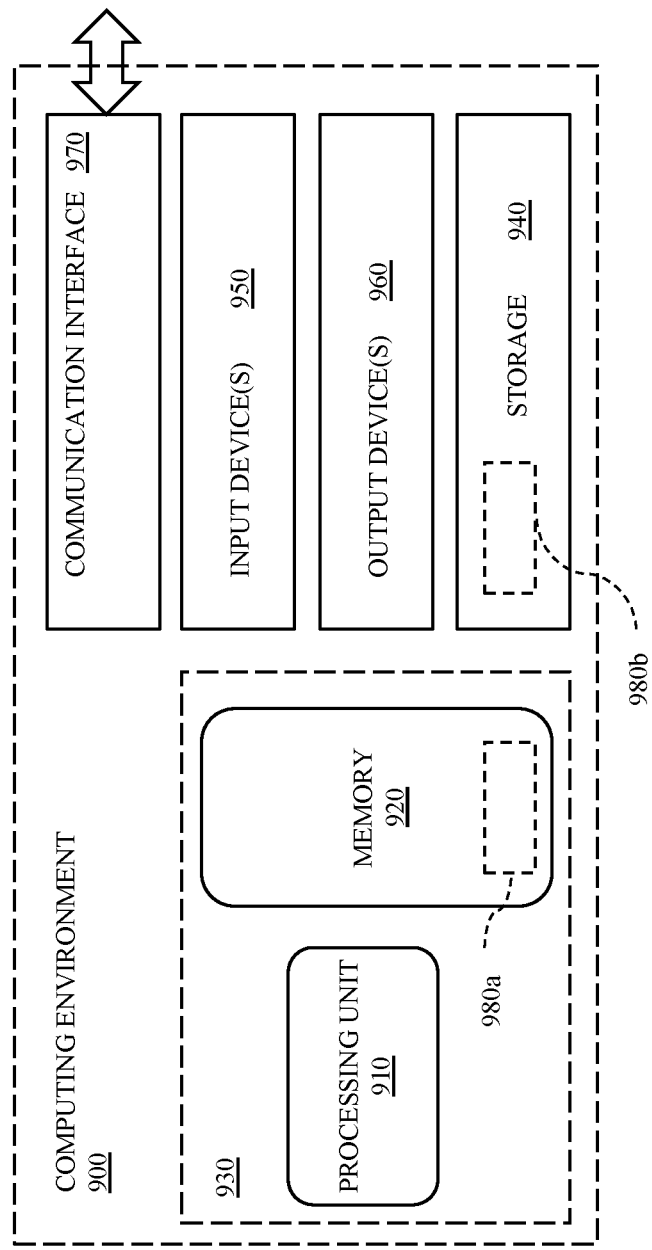
FIG. 9 illustrates a block diagram showing aspects of a computing environment.

FIG. 9 illustrates a generalized example of a suitable computing environment 900 in which described methods, embodiments, techniques, and technologies relating, for example, to acoustic control for an appliance, e.g., an appliance 100, can be implemented. The computing environment 900 is not intended to suggest any limitation as to scope of use or functionality of the technologies disclosed herein, as each technology may be implemented in diverse general-purpose or special-purpose computing environments, including within an appliance. For example, each disclosed technology may be implemented with other computer system configurations, including wearable and/or handheld appliances (e.g., a mobile-communications device, such as, for example, IPHONE®/IPAD®/AIRPODS®/HOMEPOD™ devices, available from Apple Inc. of Cupertino, Calif.), multiprocessor systems, microprocessor-based or programmable consumer electronics, embedded platforms, network computers, minicomputers, mainframe computers, smartphones, tablet computers, data centers, appliances, and the like. Each disclosed technology may also be practiced in distributed computing environments where tasks are performed by remote processing devices that are linked through a communications connection or network. In a distributed computing environment, program modules may be located in both local and remote memory storage devices.

The computing environment 900 includes at least one central processing unit 910 and a memory 920. In FIG. 9, this most basic configuration 930 is included within a dashed line. The central processing unit 910 executes computer-executable instructions and may be a real or a virtual processor. In a multi-processing system, or in a multi-core central processing unit, multiple processing units execute computer-executable instructions (e.g., threads) to increase processing speed and as such, multiple processors can run simultaneously, despite the processing unit 910 being represented by a single functional block.

A processing unit, or processor, can include an application specific integrated circuit (ASIC), a general-purpose microprocessor, a field-programmable gate array (FPGA), a digital signal controller, or a set of hardware logic structures (e.g., filters, arithmetic logic units, and dedicated state machines) arranged to process instructions.

The memory 920 may be volatile memory (e.g., registers, cache, RAM), non-volatile memory (e.g., ROM, EEPROM, flash memory, etc.), or some combination of the two. The memory 920 stores instructions for software 980a that can, for example, implement one or more of the technologies described herein, when executed by a processor. Disclosed technologies can be embodied in software, firmware, or hardware (e.g., an ASIC).

A computing environment may have additional features. For example, the computing environment 900 includes storage 940, one or more input devices 950, one or more output devices 960, and a communication interface 970. An interconnection mechanism (not shown) such as a bus, a controller, or a network, can interconnect the components of the computing environment 900. Typically, operating system software (not shown) provides an operating environment for other software executing in the computing environment 900, and coordinates activities of the components of the computing environment 900.

The storage 940 may be removable or non-removable, and can include selected forms of machine-readable media. In general, machine-readable media includes magnetic disks, magnetic tapes or cassettes, non-volatile solid-state memory, CD-ROMs, CD-RWs, DVDs, magnetic tape, optical data storage devices, and carrier waves, or any other machine-readable medium which can be used to store information and which can be accessed within the computing environment 900. The storage 940 can store instructions for the software 980b that can, for example, implement technologies described herein, when executed by a processor.

The storage 940 can also be distributed, e.g., over a network so that software instructions are stored and executed in a distributed fashion. In other embodiments, e.g., in which the storage 940, or a portion thereof, is embodied as an arrangement of hardwired logic structures, some (or all) of these operations can be performed by specific hardware components that contain the hardwired logic structures. The storage 940 can further be distributed, as between or among machine-readable media and selected arrangements of hardwired logic structures. Processing operations disclosed herein can be performed by any combination of programmed data processing components and hardwired circuit, or logic, components.

The input device(s) 950 may be any one or more of the following: a touch input device, such as a keyboard, keypad, mouse, pen, touchscreen, touch pad, or trackball; a voice input device, such as one or more microphone transducers, speech-recognition technologies and processors, and combinations thereof; a scanning device; or another device, that provides input to the computing environment 900. For audio, the input device(s) 950 may include a microphone or other transducer (e.g., a sound card or similar device that accepts audio input in analog or digital form), or a computer-readable media reader that provides audio samples and/or machine-readable transcriptions thereof to the computing environment 900.

Speech-recognition technologies that serve as an input device can include any of a variety of signal conditioners and controllers, and can be implemented in software, firmware, or hardware. Further, the speech-recognition technologies can be implemented in a plurality of functional modules. The functional modules, in turn, can be implemented within a single computing environment and/or distributed between or among a plurality of networked computing environments. Each such networked computing environment can be in communication with one or more other computing environments implementing a functional module of the speech-recognition technologies by way of a communication connection.

The output device(s) 960 may be any one or more of a display, printer, loudspeaker transducer, DVD-writer, signal transmitter, or another device that provides output from the computing environment 900. An output device can include or be embodied as a communication connection 970.

The communication interface 970 enables communication over or through a communication medium (e.g., a connecting network) to another computing entity. A communication interface can include a transmitter and a receiver suitable for communicating over a local area network (LAN), a wide area network (WAN) connection, or both. LAN and WAN connections can be facilitated by a wired connection or a wireless connection. If a LAN or a WAN connection is wireless, the communication interface can include one or more antennas or antenna arrays. The communication medium conveys information such as computer-executable instructions, compressed graphics information, processed signal information (including processed audio signals), or other data in a modulated data signal. Examples of communication media for so-called wired connections include fiber-optic cables and copper wires. Communication media for wireless communications can include electromagnetic radiation within one or more selected frequency bands.

Machine-readable media are any available media that can be accessed within a computing environment 900. By way of example, and not limitation, with the computing environment 900, machine-readable media include memory 920, storage 940, communication media (not shown), and combinations of any of the above. Tangible machine-readable (or computer-readable) media exclude transitory signals.

As explained above, some disclosed principles can be embodied in a storage 940. Such a store can include tangible, non-transitory machine-readable medium (such as microelectronic memory) having stored thereon or therein instructions. The instructions can program one or more data processing components (generically referred to here as a "processor") to perform one or more processing operations described herein, including estimating, computing, calculating, measuring, adjusting, sensing, measuring, filtering, correlating, and decision making, as well as, by way of example, addition, subtraction, inversion, and comparison. In some embodiments, some or all of these operations (of a machine process) can be performed by specific electronic hardware components that contain hardwired logic (e.g., dedicated digital filter blocks). Those operations can alternatively be performed by any combination of programmed data processing components and fixed, or hardwired, circuit components.

VI. Other Embodiments

The examples described above generally concern apparatus, methods, and related systems to coordinate communication between speech-controllable appliances and external devices while receiving speech containing commands. Nonetheless, disclosed apparatus, methods, and related systems can control other forms of electronic devices, such as, for example, watches and other wearable devices, smart phones, tablets, laptop computers, desktop computers, as well as other automotive, home and office computing environments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The previous description is provided to enable a person skilled in the art to make or use the disclosed principles. Embodiments other than those described above in detail are contemplated based on the principles disclosed herein, together with any attendant changes in configurations of the respective apparatus described herein, without departing from the spirit or scope of this disclosure. Various modifications to the examples described herein will be readily apparent to those skilled in the art.

Directions and other relative references (e.g., up, down, top, bottom, left, right, rearward, forward, etc.) may be used to facilitate discussion of the drawings and principles herein, but are not intended to be limiting. For example, certain terms may be used such as "up," "down,", "upper," "lower," "horizontal," "vertical," "left," "right," and the like. Such terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" surface can become a "lower" surface simply by turning the object over. Nevertheless, it is still the same surface and the object remains the same. As used herein, "and/or" means "and" or "or", as well as "and" and "or." Moreover, all patent and non-patent literature cited herein is hereby incorporated by reference in its entirety for all purposes.

And, those of ordinary skill in the art will appreciate that the exemplary embodiments disclosed herein can be adapted to various configurations and/or uses without departing from the disclosed principles. Applying the principles disclosed herein, it is possible to provide a wide variety of appliances, and related methods and systems, that are selectively responsive to ultrasonic signal content. For example, the principles described above in connection with any particular example can be combined with the principles described in connection with another example described herein. Thus, all structural and functional equivalents to the features and method acts of the various embodiments described throughout the disclosure that are known or later come to be known to those of ordinary skill in the art are intended to be encompassed by the principles described and the features claimed herein. Accordingly, neither the claims nor this detailed description shall be construed in a limiting sense, and following a review of this disclosure, those of ordinary skill in the art will appreciate the wide variety of appliances, and related methods and systems that can be devised under disclosed and claimed concepts.

Moreover, nothing disclosed herein is intended to be dedicated to the public regardless of whether such disclosure is explicitly recited in the claims. No claim feature is to be construed under the provisions of 35 USC 112(f), unless the feature is expressly recited using the phrase "means for" or "step for".

The appended claims are not intended to be limited to the embodiments shown herein, but are to be accorded the full scope consistent with the language of the claims, wherein reference to a feature in the singular, such as by use of the article "a" or "an" is not intended to mean "one and only one" unless specifically so stated, but rather "one or more". Further, in view of the many possible embodiments to which the disclosed principles can be applied, we reserve to the right to claim any and all combinations of features and technologies described herein as understood by a person of ordinary skill in the art, including, for example, all that comes within the scope and spirit of the following claims.

We currently claim:

1. An appliance comprising a microphone transducer, a processor, and a memory storing instructions that, when executed by the processor, cause the appliance to:
    responsive to an activation input, receive an input audio signal via the microphone transducer and, concurrently therewith, initiate a bi-directional, wireless communication connection using a bi-directional communication profile_with an external device; and
    transmit an output audio signal corresponding to recognized speech obtained from the input audio signal over the communication connection when the wireless communication connection is established.

2. The appliance according to claim 1, wherein the bi-directional communication profile comprises a Hands-Free Profile (HFP) or a Headset Profile (HSP), and wherein the instructions further cause the appliance to determine that the wireless communication connection has been established prior to causing the appliance to output the output audio signal over the wireless communication connection.

3. The appliance according to claim 1, wherein the instructions further cause the appliance to perform, concurrently with establishing the bi-directional, wireless communication connection with the external device, an automatic speech recognition (ASR) task on the input audio signal; and to generate the output audio signal according to recognized speech received from the ASR task.

4. The appliance according to claim 3, wherein the instructions to initiate an ASR task comprise instructions to:
    record an input audio signal generated by the microphone transducer;
    transmit the input audio signal to an ASR engine; and
    receive recognized speech from the ASR engine.

5. The appliance according to claim 4, wherein the instructions further cause the appliance to invoke a task responsive to the recognized speech and to generate an output audio signal corresponding to the invoked task.

6. The appliance according claim 3, wherein the instructions to initiate an ASR task comprise instructions to initiate the ASR task at an ASR engine local to the appliance.

7. The appliance according claim 3, wherein the instructions to initiate an ASR task comprise instructions to initiate the ASR task at an ASR engine remote from the appliance.

8. The appliance according to claim 1, wherein the instructions further cause the appliance to receive, from the external device over the bi-directional wireless communication connection, a second input audio signal corresponding to an audio input to a microphone of the external device and to transmit the second input audio signal to an ASR engine.

9. The appliance according to claim 1, wherein the instructions further cause the appliance to:
    receive a first input audio signal from the microphone transducer;

receive a second input audio signal over the wireless communication connection; and transmit, to an ASR engine, the first input audio signal, the second input audio signal, or a combination thereof.

10. The appliance according to claim 9, wherein the instructions further cause the appliance to:

determine a measure of audio quality for the first input audio signal and a measure of audio quality of the second input audio signal, wherein the audio quality corresponds to an ordered range of values, wherein the values at one end of the range indicate worse audio quality and the values at the other end of the range indicate better audio quality;

select the input audio signal having the measure indicative of better audio quality; and transmit the selected input audio signal to the ASR engine.

11. The appliance according to claim 1, wherein the instructions further cause the appliance to transmit an input audio signal to an ASR engine, wherein the input audio signal is received from the microphone transducer or over the wireless communication connection.

12. The appliance according to claim 11, wherein the instructions cause the appliance to determine that the wireless communication connection is established and to receive the input audio signal over the wireless communication connection responsive to that determination.

13. An electronic appliance comprising:

an audio acquisition module comprising a microphone transducer and configured, responsive to detecting an activation input, to record an input audio signal corresponding to sound received by the microphone transducer;

an audio processing module configured to determine recognized speech corresponding to the input audio signal;

a command processing component configured to process the recognized speech to identify a task, and to execute the task, wherein an audio response is generated based on execution of the task; and a communication coordinator configured to: open a bi-directional wireless communication connection to an external device, responsive to detecting the activation input, and concurrently with the recording of the input audio signal; and transmit the generated audio response to the external device over the bi-directional wireless communication connection.

14. The electronic appliance of claim 13, wherein the communication coordinator is further configured to buffer the audio response when the bi-directional wireless communication connection is not yet established.

15. The electronic appliance of claim 13, wherein the audio processing module is configured to receive a second input audio signal over the wireless communication connection, combine the second input audio signal with the recorded input audio signal, and obtain recognized speech from the combined signal.

16. The electronic appliance of claim 13, wherein the audio processing module is configured to receive a second input audio signal over the wireless communication connection, compare the second input audio signal with the recorded input audio signal according to a measure of audio quality, wherein the audio quality corresponds to an ordered range of values, wherein the values at one end of the range indicate worse audio quality and the values at the other end of the range indicate better audio quality, select the input audio signal having the measure indicative of better audio quality, and obtain recognized speech from the selected input audio signal.

17. The electronic appliance of claim 13, wherein the audio processing module is configured to obtain recognized speech from a local speech recognition engine.

18. The electronic appliance of claim 13, wherein the audio processing module is configured to obtain recognized speech from a remote speech recognition engine.

19. The electronic appliance of claim 13, further comprising an application, wherein the command processing component is configured to cause the application to execute the task.

20. A method comprising:

receiving audio input from a microphone on an appliance responsive to receiving an activation input;

initiating a bi-directional wireless communication connection to an external device concurrently with receiving the audio input, responsive to receiving the activation input;

obtaining recognized speech from the received audio input;

generating an output audio signal corresponding to the recognized speech;

determining that the bi-directional wireless communication connection is established; and responsive to the determining, transmitting the output audio signal to the external device over the bi-directional wireless communication connection.

21. The appliance of claim 1, wherein the instructions, when executed by the processor, further cause the appliance to interrupt a current audio output task on the external device using the bi-directional wireless communication connection.

* * * * *

UNITED STATES PATENT AND TRADEMARK OFFICE
CERTIFICATE OF CORRECTION

PATENT NO. : 11,735,187 B2
APPLICATION NO. : 16/868351
DATED : August 22, 2023
INVENTOR(S) : Myra C. Lukens et al.

It is certified that error appears in the above-identified patent and that said Letters Patent is hereby corrected as shown below:

In the Claims

Column 20, Line 22 (Claim 1):
"profile_with an"
Should read:
--profile with an--

Column 20, Line 51 (Claim 6):
"according claim 3,"
Should read:
--according to claim 3,--

Column 20, Line 54 (Claim 7):
"according claim 3,"
Should read:
--according to claim 3,--

Signed and Sealed this
Thirteenth Day of February, 2024

Katherine Kelly Vidal
*Director of the United States Patent and Trademark Office*